(12) United States Patent
Watanabe et al.

(10) Patent No.: US 8,296,029 B2
(45) Date of Patent: Oct. 23, 2012

(54) PARKING BRAKE CONTROL SYSTEM

(75) Inventors: Takashi Watanabe, Nagoya (JP);
Kazuma Kondo, Aichi-gun (JP)

(73) Assignee: Advics, Co., Ltd., Kariya, Aichi-Pref. (JP)

( * ) Notice: Subject to any disclaimer, the term of this patent is extended or adjusted under 35 U.S.C. 154(b) by 965 days.

(21) Appl. No.: 12/247,803

(22) Filed: Oct. 8, 2008

(65) Prior Publication Data

US 2009/0099748 A1    Apr. 16, 2009

(30) Foreign Application Priority Data

Oct. 10, 2007  (JP) ................................ 2007-264478

(51) Int. Cl.
*B60T 7/08*    (2006.01)
*B60T 1/00*    (2006.01)

(52) U.S. Cl. ............ 701/70; 188/72.3; 188/265; 303/89
(58) Field of Classification Search ............ 701/70; 303/3, 20, 89; 188/156, 72.3, 265; *B60T 1/00, B60T 7/08*
See application file for complete search history.

(56) References Cited

U.S. PATENT DOCUMENTS

| 4,629,043 | A | * | 12/1986 | Matsuo et al. | 477/184 |
| 6,209,689 | B1 | * | 4/2001 | Bohm | 188/156 |
| 6,213,259 | B1 | * | 4/2001 | Hanson et al. | 188/156 |
| 6,249,737 | B1 | * | 6/2001 | Zipp | 701/70 |
| 6,533,082 | B2 | | 3/2003 | Gill et al. | |
| 6,609,595 | B2 | * | 8/2003 | Flynn et al. | 188/156 |
| 6,701,242 | B1 | * | 3/2004 | Diebold | 701/70 |
| 7,407,463 | B2 | * | 8/2008 | Kinder | 477/170 |
| 7,458,649 | B2 | * | 12/2008 | Jeon | 303/89 |
| 7,904,227 | B2 | * | 3/2011 | Fukasawa | 701/70 |
| 8,167,096 | B2 | * | 5/2012 | Ganzhorn et al. | 188/73.38 |
| 2002/0027386 | A1 | * | 3/2002 | Yanaka et al. | 303/3 |
| 2003/0062766 | A1 | * | 4/2003 | Bottiglieri | 303/89 |
| 2004/0026989 | A1 | * | 2/2004 | Suzuki et al. | 303/89 |
| 2006/0170282 | A1 | * | 8/2006 | Yamaguchi et al. | 303/20 |

FOREIGN PATENT DOCUMENTS

| JP | 2000062607 A | * | 2/2000 |
| JP | 2001221082 A | * | 8/2001 |
| JP | 2001260831 A | * | 9/2001 |
| JP | 2002-205627 A | | 7/2002 |
| JP | 2005-329930 A | | 12/2005 |
| JP | 2006151210 A | * | 6/2006 |

* cited by examiner

*Primary Examiner* — Tuan C. To
(74) *Attorney, Agent, or Firm* — Buchanan Ingersoll & Rooney PC

(57) ABSTRACT

A motor current detecting device is provided in a parking brake control system for detecting electric current flowing through an electric motor. And current supply to the electric motor is stopped in case of carrying out a parking brake releasing operation, when a time period in which a differentiated value of the electric current flowing through the electric motor is smaller than a predetermined threshold value exceeds a predetermined time. As a result, a partial braking condition, in which parking brake force partly remains even after the parking brake releasing operation, and which is caused by, for example, the elongation of the brake cable is prevented.

2 Claims, 12 Drawing Sheets

PARKING BRAKE CONTROL SYSTEM

CROSS REFERENCE TO RELATED APPLICATION

This application is based on Japanese Patent Application No. 2007-264478 filed on Oct. 10, 2007, the disclosure of which is incorporated herein by reference.

FIELD OF THE INVENTION

The present invention relates to a parking brake control system for a vehicle, which controls a locking operation and a releasing operation of an electronic parking brake (hereinafter also referred to as EPB).

BACKGROUND OF THE INVENTION

A parking brake system is installed in a vehicle for restricting a vehicle movement during its parking condition. There is a manually operated parking brake system, according to which an operational force is transmitted to a brake device by pulling a brake cable by means of a brake lever. There is an electrically operated parking brake system, according to which a rotational force of an electric motor is transmitted to the brake device by pulling the brake cable by use of the electric motor.

According to an electronic parking brake (EPB) system, which is one of the electrically operated parking brake systems, an electric motor is rotated in a direction for a locked condition (in a forward direction) in order to transmit the rotational force of the electric motor to a brake device when locking parking brake thereof, and the rotation of the electric motor is stopped while generated braking force is maintained. When un-locking (releasing) the parking brake, the electric motor is rotated in a direction for un-locked (released) condition (in a reversed direction), so that the parking brake is released.

According to a conventional electronic parking brake system, such as disclosed in Japanese Patent Publication No. 2002-205627, an electric motor is rotated in a direction of a locked condition until electric current to the electric motor reaches at a predetermined value when locking the parking brake. On the other hand, the electric motor is rotated in a direction of an un-locked (released) condition until a number of rotation of the electric motor reaches at a predetermined value when un-locking (releasing) the parking brake. In other words, the number of rotation of the electric motor for releasing the parking brake (the rotation in the reversed direction) corresponds to a number of rotation of the electric motor for locking the parking brake. Namely, the number of rotation of the electric motor in case of releasing the parking brake corresponds to a cable length, for which the brake cable is pulled when locking the parking brake.

According to another conventional electronic parking brake system, such as disclosed in Japanese Patent Publication No. 2005-329930, an electric motor is likewise rotated in a direction of a locked condition until electric current to the electric motor reaches at a predetermined value when locking the parking brake. A stroke of a brake device is measured during the operation for locking the parking brake, and then the electric motor is rotated in a releasing direction until the rotation of the electric motor reaches at a value, which is obtained by adding an amount corresponding to an elongation of a brake to the above measured stroke.

In the above first mentioned conventional electronic parking brake system (No. 2002-205627), a releasing (un-locking) operation of the parking brake is ended when the number of motor rotation reaches at such an amount corresponding to the length of the brake cable, for which the brake cable was pulled by the electric motor during the locking operation. However, in such a control, a control error may become larger, as a result of being influenced by elongation of the brake cable.

In the above second mentioned conventional electronic parking brake system (No. 2005-329930), the stroke of the brake device is measured during the locking operation, and the electric motor is rotated in the reversed direction (the releasing direction), until the rotation of the electric motor in the reversed direction corresponds to the value, which is obtained by adding the amount corresponding to the elongation of the brake cable to the above measured stroke. However, in such a control, although the elongation of the brake cable is taken into consideration, the releasing operation may not be sufficiently carried out when the parking brake is maintained in the locked condition for a long period. In other words, when the elongation of the brake cable may become larger than that estimated during such a longer period, such elongation may affect the precise control for the releasing operation. Then, the control error may happen to occur.

When the control error may occur, a partial braking condition may be continued as a result of insufficient releasing operation. Namely, it is a problem that a braking force is still generated even when the locked condition of the parking brake (the locked condition of the EPB system) has been released.

SUMMARY OF THE INVENTION

The present invention is, therefore, made in view of the foregoing problem, and has an object to provide a parking brake control system for a vehicle, according to which a partial braking condition caused by, for example, the elongation of the brake cable is prevented.

According to a feature of the present invention, a parking brake control system for a vehicle has a switching device operated by a vehicle driver and a parking brake device provided at a vehicle wheel. The parking brake device has a movable frictional member and a fixed member, so that a braking force is generated at the parking brake device and applied to the vehicle wheel when the movable frictional member is moved to be pressed against the fixed member.

The parking brake control system further has an electric motor, which is operatively connected to the movable frictional member of the parking brake device via a brake cable, so that the brake cable is pulled by a rotation of the electric motor in a forward direction to move the movable frictional member in order to generate the braking force at the parking brake device, and the brake cable is released by the rotation of the electric motor in a reversed direction so as to move the movable frictional member to release the braking force generated at the parking brake device.

The parking brake control system further has a motor current detecting device for detecting electric current flowing through the electric motor, and an electronic control unit electrically connected to the switching device and the electric motor so as to drive the electric motor for carrying out a parking brake locking operation or a parking brake releasing operation upon receiving a control signal from the switching device.

According to the parking brake control system, the current supply to the electric motor is stopped in case of carrying out the parking brake releasing operation, when a time period in which a differentiated value of the electric current flowing through the electric motor is smaller than a predetermined threshold value exceeds a predetermined time.

According to another feature of the invention, the predetermined time is set at such a value, during which a predetermined gap is estimated as having been formed between the movable frictional member and the fixed member, since the braking force has been released.

According to a further feature of the invention, the predetermined time is changed depending on a power supply voltage to be applied to the electric motor, so that the predetermined time is changed to a smaller value as the power supply voltage is higher.

According to a still further feature of the invention, the predetermined time is changed to a smaller value, as an absolute value of the differentiated value of the electric current is larger.

According to a still further feature of the invention, the predetermined time is changed to a smaller value, as an absolute value of a minimum value for the differentiated value of the electric current is larger.

According to a still further feature of the invention, a releasing control time for the parking brake releasing operation is measured by a time counter from a start of the rotation of the electric motor in the reversed direction, and a step of determination, in which the electronic control unit determines whether the differentiated value of the electric current flowing through the electric motor is smaller than the predetermined threshold value, is carried out only when the releasing control time is larger than a predetermined minimum value for the parking brake releasing operation.

According to a still further feature of the invention, a step of determination, in which the electronic control unit determines whether the differentiated value of the electric current flowing through the electric motor is smaller than the predetermined threshold value, is carried out only when the electric current is smaller than a threshold value.

According to a still further feature of the invention, the step of determination, in which the electronic control unit determines whether the differentiated value of the electric current flowing through the electric motor is smaller than the predetermined threshold value, is carried out only when the electric current is smaller than a maximum value of a no-load current for the electric motor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
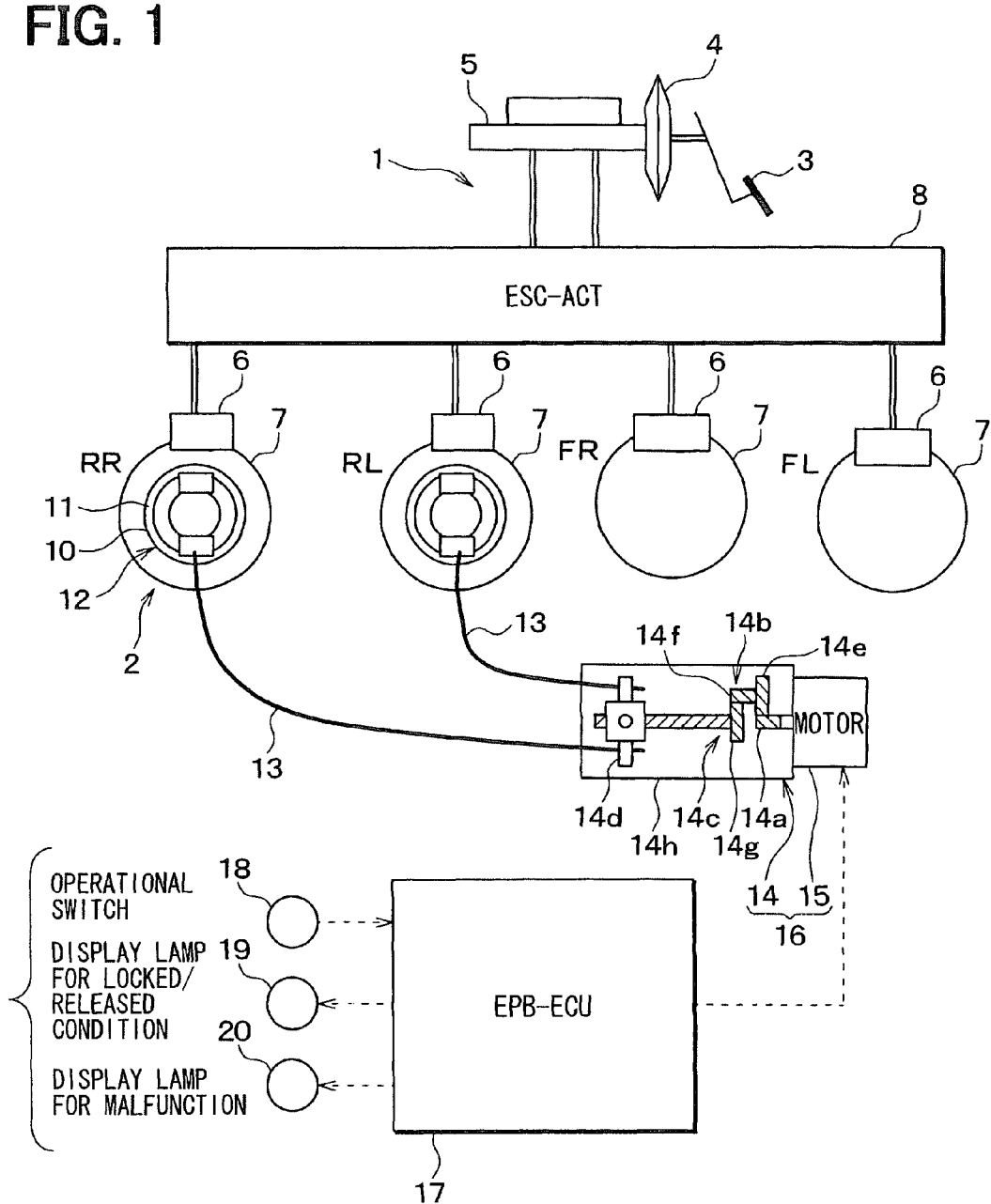
FIG. 1 is a schematic view showing an entire structure of a brake system for a vehicle, to which a parking brake control system according to a first embodiment of the present invention is applied.

A first embodiment of the present invention will be hereinafter explained with reference to the drawings. FIG. 1 is a schematic view showing an entire structure of a brake system for a vehicle, to which a parking brake control system according to a first embodiment of the present invention is applied.

As shown in FIG. 1, a brake system has an ordinary brake system 1 for generating braking force depending on a brake pedal operation by a vehicle driver and an electronic parking brake (EPB) system 2 for restricting a vehicle movement during its parking condition.

In the ordinary brake system 1, a pedal stepping force applied to a brake pedal 3 by the vehicle driver is correspondingly increased by a brake booster 4, so that a brake fluid pressure is generated in a master cylinder 5 depending on the increased pedal stepping force. The brake fluid pressure is applied to wheel cylinders 6 of respective vehicle wheels to generate braking force. More exactly, when the brake fluid pressure is transmitted to the wheel cylinders 6, a brake disc 7 is pressed by brake pads provided at a caliper in a sandwiched manner to generate a frictional force between them, to thereby generate the braking force. A brake actuator 8 is provided between the master cylinder 5 and the wheel cylinders 6 for controlling the brake fluid pressure, so that the braking force generated by the ordinary brake system 1 is adjusted. Since an operation of the ordinary brake system 1 is well known in the art, the detailed explanation thereof is omitted here.

The electronic parking brake (EPB) system 2 is composed of a parking brake device 12, an EPB actuator 16 and an EPB electronic control unit (EPB-ECU) 17. The parking brake device 12 has a drum 10 and a brake shoe 11 for a parking brake operation. The EPB actuator 16 has brake cables 13, a gear mechanism 14, and an electric motor 15.

The parking brake device 12 generates the braking force in such a manner that a frictional surface of the brake shoe 11 (made of a friction material) is brought into contact with (pressed against) an inner surface of the drum 10 (made of a non-friction material). The movement of the vehicle during the parking condition thereof is restricted by the braking force generated by the parking brake device 12. The brake shoe 11 of the parking brake device 12 is operated by the brake cable 13 provided in the EPB actuator 16. When the brake cable 13 is pulled by the EPB actuator 16, the frictional surface of the brake shoe 11 is brought into contact with (pressed against)

the inner surface of the drum 10 by a tensile force of the brake cable 13 to generate the braking force. When the pulling force for the brake cable 13 is released, the frictional surface of the brake shoe 11 is brought out of contact from the inner surface of the drum 10, to thereby release the braking force. The brake cable 13 is pulled or released by a force converted from a rotational force of the electric motor 15 into a linear movement by the gear mechanism 14 provided in the EPB actuator 16.

The gear mechanism 14 has an input gear 14a provided on an output shaft of the electric motor 15, a speed reduction gear 14b, an output shaft 14c and a drive nut 14d. The speed reduction gear 14b is composed of a first gear 14e engaged with the input gear 14a, and a second gear 14f coaxially provided with the first gear 14e and having a smaller number of cogs than the first gear 14e. The output shaft 14c is a drive screw having a male thread groove. A third gear 14g is formed at one end of the output shaft 14c, wherein the third gear 14g is engaged with the second gear 14f of the speed reduction gear 14b. When the third gear 14g is driven by the electric motor 15 via the speed reduction gear 14b, the drive screw portion is coaxially rotated with the third gear 14g. The drive nut 14d is movably supported by a guide member (not shown), which is provided in a gear box 14h for the gear mechanism 14, so that the drive nut 14d is moved in a linear motion in an axial direction of the output shaft 14c. The brake cables 13 are fixed to the drive nut 14d, so that the brake cables 13 are pulled or released when the drive nut 14d is moved along the output shaft 14c in accordance with the rotation of the electric motor 15.

According to the above gear mechanism 14, when the rotation of the electric motor 15 is stopped, the rotation of the respective gears are also stopped to hold the brake cables 13 at such position by a frictional force of the engagement between the output shaft 14c and the drive nut 14d. Accordingly, when the brake cables 13 are pulled by the rotation of the electric motor 15 to generate the braking force at the parking brake devices 12, the above generated braking force is held even when the rotation of the electric motor 15 is thereafter stopped.

The EPB-ECU 17 is composed of a well-known microcomputer having CPU, ROM, RAM, I/O, and so on. The EPB-ECU 17 performs the parking brake control operation by carrying out a control process for the rotation of the electric motor 15 in accordance with a program stored in a memory device, such as ROM. A signal of switching operation, which is carried out by operating an operational switch 18, for example, provided in an instrument panel (not shown) in a vehicle passenger room, is inputted to the EPB-ECU 17. The EPB-ECU 17 operates the electric motor 15 in accordance with the inputted signal from the operational switch 18. The EPB-ECU 17 outputs a signal to a display lamp 19 provided in the instrument panel, wherein the lamp 19 indicates a locked condition or un-locked (released) condition of the parking brake, depending on an operational condition of the electric motor 15. The EPB-ECU 17 further outputs a signal to a lamp 20, which displays a malfunction condition, when any malfunction of the EPB system 2 occurs.

Figure 2:
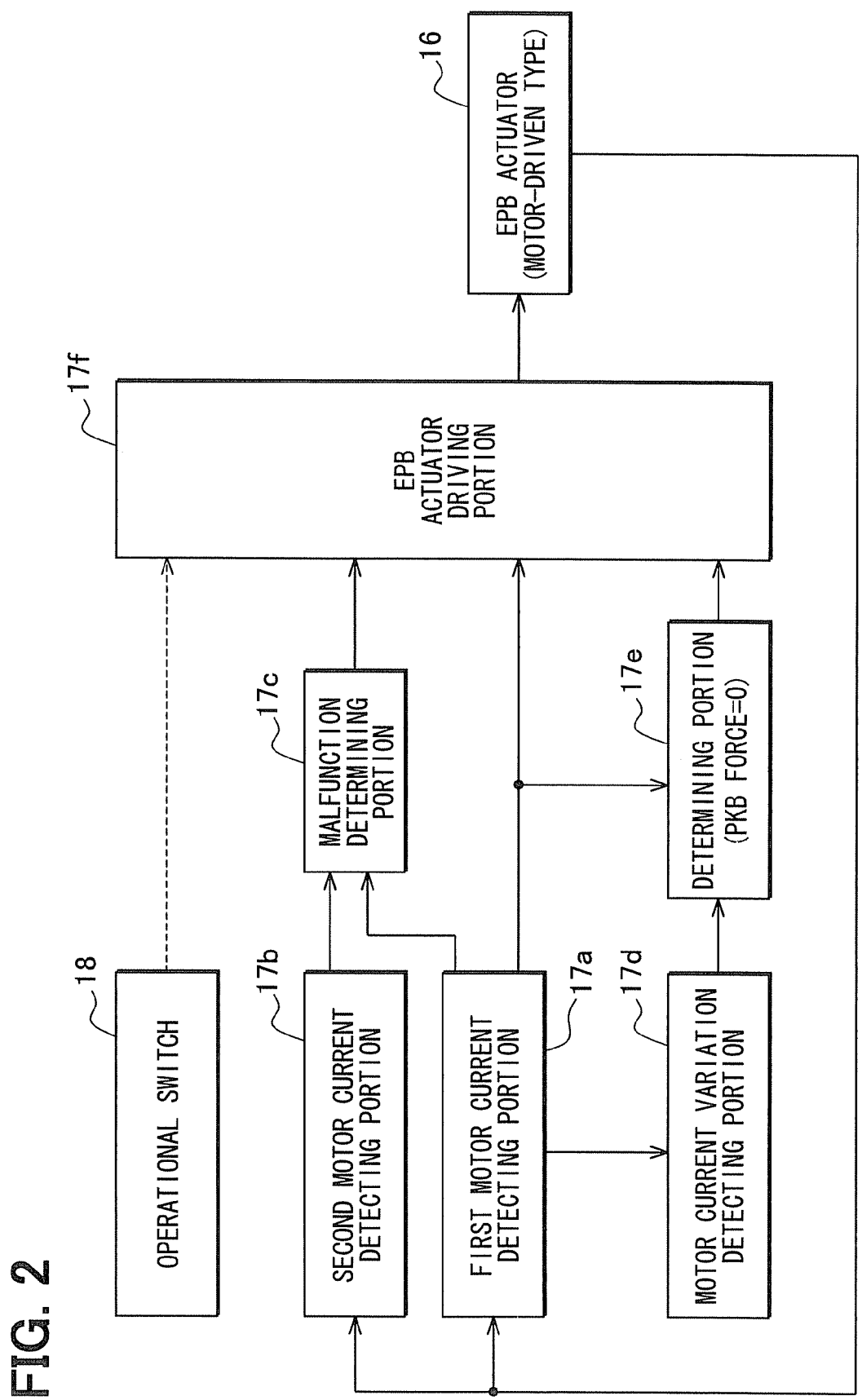
FIG. 2 is a block diagram showing an inside structure of EPB-ECU, which is an electronic control unit (ECU) of an electronic parking brake (EPB) control system of the invention.

FIG. 2 is a block diagram showing an inside structure of the EPB-ECU 17. As shown in FIG. 2, the EPB-ECU 17 has first and second motor current detecting portions 17a and 17b, a malfunction determining portion 17c, a motor current variation detecting portion 17d, a determining portion 17e, and an EPB actuator driving portion 17f.

The first and second motor current detecting portions 17a and 17b detect electric current (motor current) supplied to (flowing through) the electric motor 15 at different two portions, for example, at an upstream side and a downstream side of the electric motor 15. The first and second motor current detecting portions 17a and 17b will be further explained with reference to FIG. 3.

Figure 3:
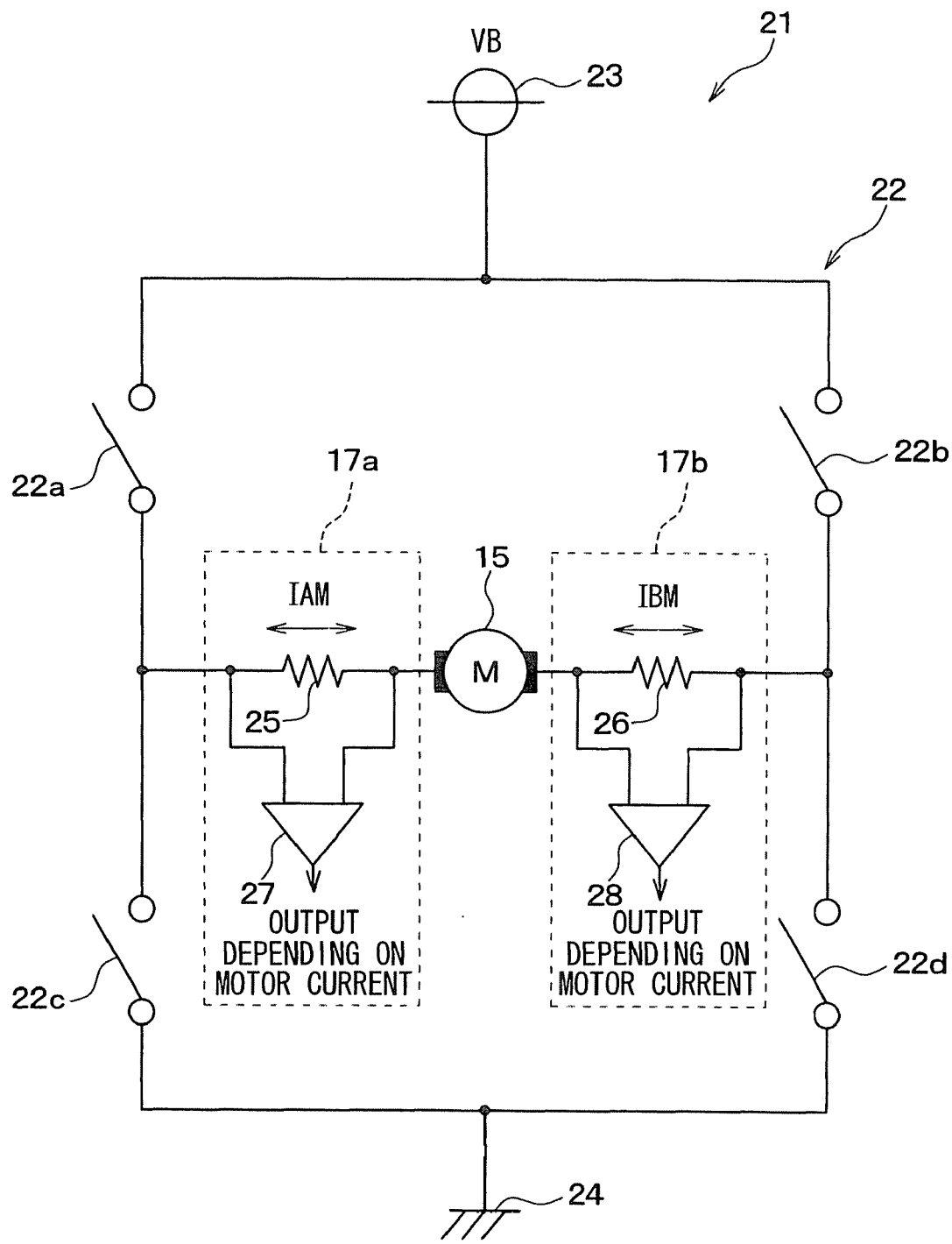
FIG. 3 is a schematic view showing an electric motor driving circuit for controlling electric current to be supplied to an electric motor.

FIG. 3 is a schematic view showing an electric motor driving circuit 21 for controlling the electric current supplied to the electric motor 15. As shown in FIG. 3, the motor driving circuit 21 has a H-type bridge circuit 22, wherein all of switches 22a to 22d are turned off when stopping the operation of the electric motor 15. And each pair of the diagonally arranged switches (22a and 22d, or 22b and 22c) of the bridge circuit 22 is turned on or turned off in order to selectively supply the electric current to the electric motor 15 in different directions.

Current detecting resisters 25 and 26 are respectively provided at both sides of the electric motor 15, namely the resister 25 is provided between the electric motor 15 and a junction point of the switches 22a and 22c, whereas the resister 26 is provided between the electric motor 15 and a junction point of the switches 22b and 22d. Electric potentials at both sides of each resister 25 and 26 are inputted to respective operational amplifiers 27 and 28, so that each of outputted electric potentials from the operational amplifiers 27 and 28 corresponds to electric current IAM (or IBM) flowing through the respective resisters 25 and 26. As above, each of the current detecting resisters 25 and 26 and each of the operational amplifiers 27 and 28 respectively form the first and second motor current detecting portions 17a and 17b, wherein the motor current is detected at different points.

The malfunction determining portion 17c determines whether the electric motor 15 and/or the motor driving circuit 21 is out of order, based on determination whether a difference between the electric currents IAM and IBM at the different points detected by the respective motor current detecting portions 17a and 17b is within a predetermined value or not. When the malfunction determining portion 17c determines the malfunction, it transmits such detected malfunction to the EPB actuator driving portion 17f to stop the operation of the EPB system 2.

The variation detecting portion 17d detects variation of the motor current. More exactly, the variation detecting portion 17d detects variation of the motor current for each predetermined control period, that is a differentiated value of the motor current. As explained below, the differentiated value of the motor current is used for determining when the motor rotation should be stopped in the case that the electric motor 15 is rotated in the reversed direction to release the EPB system 2 (namely, to release the locked condition of the parking brake).

The determining portion 17e determines whether the braking force generated by the EPB system 2 becomes zero or not. Whether the braking force becomes zero or not is determined based on the differentiated value of the motor current detected by the above variation detecting portion 17d. A determining process at the determining portion 17e will be explained more in detail below.

The EPB actuator driving portion 17f controls the operational condition for the EPB actuator 16 by controlling the electric motor 15. The EPB actuator driving portion 17f drives the electric motor 15 to rotate in the forward direction or in the reversed direction, or stops the rotation of the electric motor 15 based on the switching operation of the switch 18, so that the parking brake is locked or un-locked (released). The EPB actuator driving portion 17f also switches over the operation of the electric motor 15 in the operation for locking or un-locking (releasing) the parking brake, based on the determination at the malfunction determining portion 17c or the determining portion 17e. The parking brake control system of the present embodiment is constructed as above.

Figure 4:
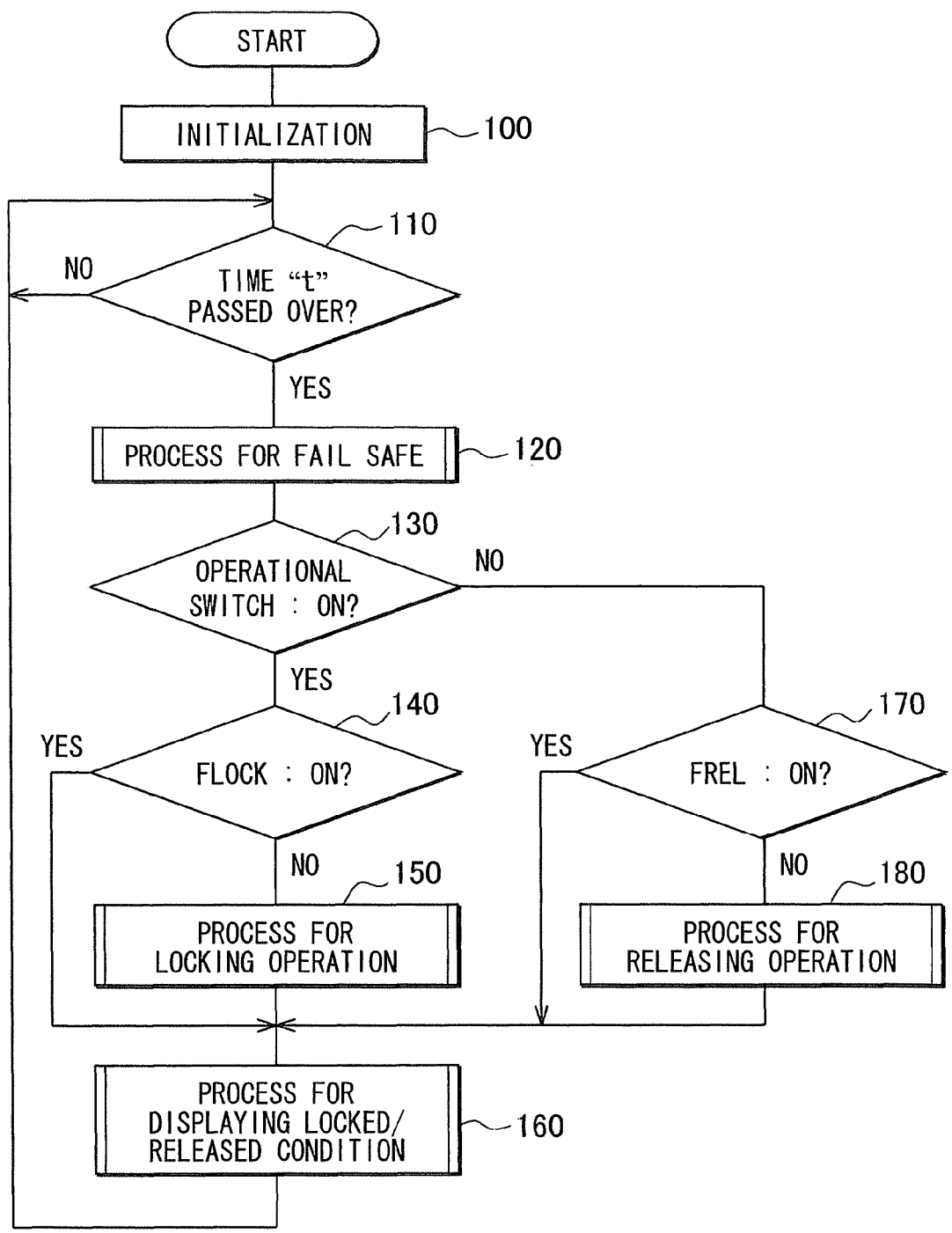
FIG. 4 is a flow-chart showing a process for a parking brake control operation.

Now, an operation of the above parking brake control system, which is carried out by the respective portions 17a to 17f of the EPB-ECU 17 in accordance with a program stored in ROM (not shown), will be explained. FIG. 4 is a flow-chart showing the process for the parking brake control operation.

At a step 100, a general initialization is carried out for resetting a time measuring counter, flags and so on. The process goes to a step 110, at which the EPB-ECU 17 determines whether a time "t" has passed over. The time "t" here defines a control cycle. In other words, the process of the step 110 is repeatedly carried out until the time "t" will pass over after the termination of the initialization process or a positive determination (YES at the determination) at the step 110, so that the parking brake control operation is carried out for each time period of "t".

Figure 5:
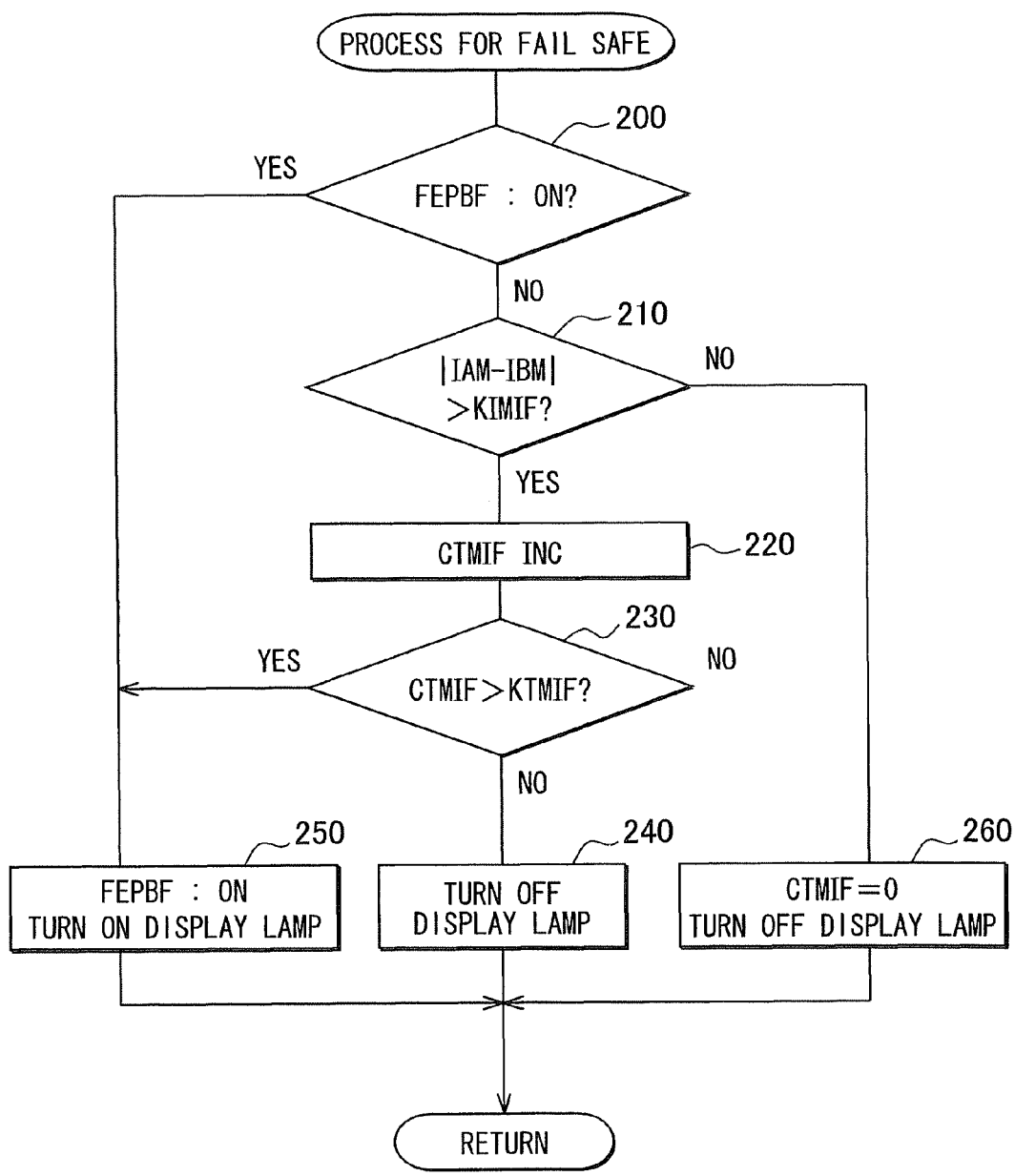
FIG. 5 is a flow-chart showing a process for a fail safe control operation.

At a step 120, a fail safe process is carried out. FIG. 5 is a flow-chart showing the process for a fail safe control operation. When the fail safe process is started, the process goes to a step 200. At the step 200, the EPB-ECU 17 determines whether a failure flag "FEPBF" for the parking brake, which indicates a failure of the parking brake operation, is turned on or not. The failure flag "FEPBF" for the parking brake is turned on at a step 250, as explained below, when the EPB-ECU 17 determines that parking brake is out of order.

When the determination at the step 200 is NO, the process goes to a step 210, at which the EPB-ECU 17 determines whether a difference between the electric currents IAM and IBM respectively detected at the first and second motor current detecting portions 17a and 17b is larger than a predetermined threshold value "KIMIF" for malfunction determination. More exactly, an absolute figure of the difference between the electric currents IAM and IBM exceeds the predetermined threshold value "KIMIF" for the malfunction determination. In a normal operation, the electric currents IAM and IBM are basically equal to each other, because both of the electric currents IAM and IBM are the electric current flowing through the same electric motor 15. However, in the case that a malfunction of the electric motor 15, a failure of short-circuit or disconnection between upstream and downstream points of the electric motor 15 or any other failure has occurred, the electric currents IAM and IBM do not come to the same value. The threshold value "KIMIF" for the malfunction determination is decided by taking into consideration detection error for the electric currents IAM and IBM. Accordingly, when the absolute figure of the difference between the electric currents IAM and IBM exceeds the threshold value "KIMIF" for the malfunction determination, the EPB-ECU 17 determines that any failure has occurred.

Even in the case the EPB-ECU 17 determined based on the motor current that any kind of malfunction has occurred, such determination might have been made based on information including noises. Accordingly, in the case of YES at the step 210, an increment process is carried out for a failure continuation timer "CTMIF" at a step 220. Then, at a step 230, the EPB-ECU 17 determines whether the failure continuation timer "CTMIF" (more exactly, a time counted by the timer "CTMIF") exceeds a predetermined threshold value "KTMIF". As above, when a condition, in which the EPB-ECU 17 determines the malfunction, continues for a predetermined time, the EPB-ECU 17 finally determines the malfunction. So long as the determination at the step 230 is NO, the process goes to a step 240 at which the lamp 20 is turned off. When the determination at the step 230 is YES, the process goes to the step 250, at which the lamp 20 is turned on and the failure flag "FEPBF" for the parking brake is also turned on. When the EPB-ECU 17 determines at the step 200 that the failure flag "FEPBF" for the parking brake is turned on, the process also goes to the step 250 to keep a turned-on condition of the lamp 20 as well as the failure flag "FEPBF" for the parking brake.

When the EPB-ECU 17 determines at the step 210 that the absolute figure of the difference between the electric currents IAM and IBM does not exceed the predetermined threshold value "KIMIF" for the malfunction determination, namely when the determination of the step 210 is NO, the process goes to a step 260, at which the failure continuation timer "CTMIF" is reset to zero and the lamp 20 is turned off. The fail safe process is thus completed.

When the fail safe process is completed, the process in FIG. 4 goes to a step 130, at which the EPB-ECU 17 determines whether the operational switch 18 is turned on or not. A turned-on condition of the operational switch 18 means that the vehicle driver intends to operate the EPB system 2 to bring the parking brake to its locked condition. On the other hand, a turned-off condition of the operational switch 18 means that the vehicle driver intends to bring the parking brake to its un-locked (released) condition.

In case of YES at the step 130, the process goes to a step 140, at which the EPB-ECU 17 determines whether a flag "FLOCK" for the locked condition is turned on or not. The flag "FLOCK" for the locked condition here means a flag, which is turned on when the parking brake has been brought into the locked condition as a result of the operation of the EPB system 2. Therefore, when the flag "FLOCK" for the locked condition is in the turned-on condition, the operation of the EPB system 2 has been already completed and a desired braking force is generated.

When the determination at the step 140 is NO, the process goes to a step 150 for a process for locking operation. In case of YES at the step 140, the process goes to a step 160 because the process for locking operation is considered as having been completed.

Figure 6:
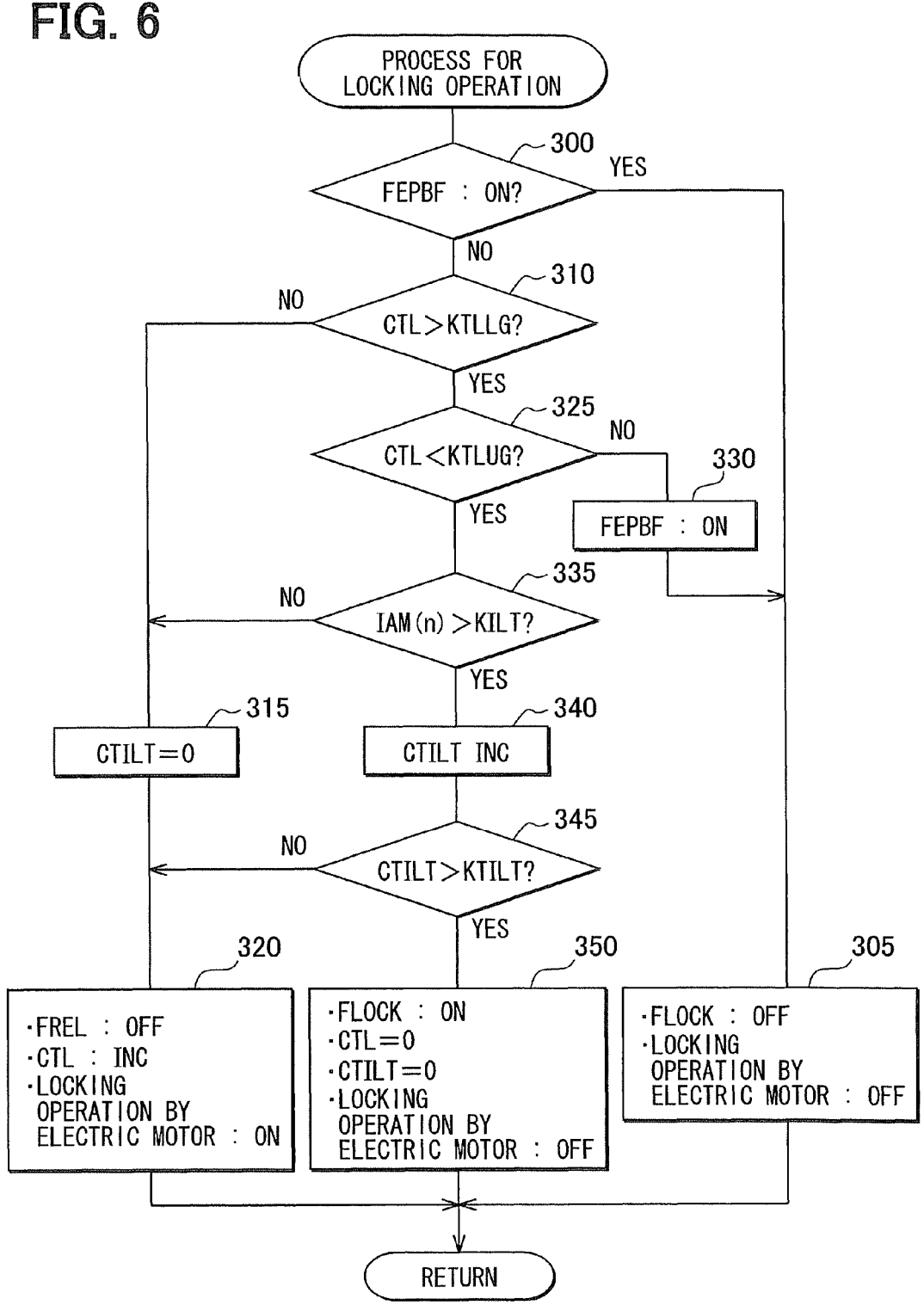
FIG. 6 is a flow-chart showing a process for a parking brake locking operation.

In the process for locking operation, the EPB system 2 is operated so that the electric motor 15 is driven to rotate, the rotation of the electric motor 15 is stopped at such a position at which the desired braking force is generated by the parking brake device 12, and such condition is maintained. FIG. 6 shows a flow-chart for the process for locking operation (a process for a parking brake locking control operation). More detailed explanation for the process of the locking operation will be made with reference to FIG. 6.

At first, the EPB-ECU 17 determines at a step 300 whether the failure flag "FEPBF" for the parking brake is turned on or not. In case of YES at the step 300, the process goes to a step 305. Since this is the case where any kind of malfunction occurs, the flag "FLOCK" for the locked condition is turned off and the locking operation by the electric motor 15 is turned off, namely the operation for the electric motor 15 is not started or stopped, at the step 305. Then, the process for the locking operation is ended. On the other hand, in case of NO at the step 300, the process goes to a step 310.

At the step 310, the EPB-ECU 17 determines whether a time counter "CTL" for the locking operation (more exactly, a time counted by the time counter "CTL") exceeds a minimum value "KTLLG" for a locking control time. The time counter "CTL" for the locking operation is a counter for measuring an elapsed time since the locking operation has been started, wherein the counter starts its counting operation immediately at the start of the locking operation. The minimum value "KTLLG" for the locking control time is a minimum time, which is estimated as being necessary for carrying out (completing) the locking operation. Therefore, the minimum value "KTLLG" for the locking control time is a value, which is in advance decided depending on a length of the brake cables 13, rotational speed of the electric motor 15 and so on.

As explained below, the EPB-ECU 17 determines that the braking force generated by the tensile force of the brake cable 13 has reached at a desired value, when the motor current reached at a target current value "KILT" for the locking operation. However, the motor current may instantaneously exceed the target current value "KILT" for the locking operation due to incoming current at an initial stage for supplying the electric current to the electric motor 15. Therefore, the initial stage for the locking operation is masked by comparing the time counter "CTL" for the locking operation and the minimum value "KTLLG" for the locking control time, so that determination error due to the incoming current can be avoided.

Accordingly, when it is in the condition that the time counter "CTL" for the locking operation (more exactly, a time counted by the time counter "CTL") does not exceed the minimum value "KTLLG" for the locking control time (the determination at the step 310 is NO), the locking operation is still being continuously carried out. The process, therefore, goes to a step 315, at which a timer "CTILT" for terminating the locking operation is initialized to zero.

Then, the process further goes to a step 320, at which a flag "FREL" for a released condition is turned off, an increment process is carried out for the time counter "CTL" for the locking operation, and the locking operation of the electric motor 15 is turned on, namely the electric motor 15 is driven to rotate in the forward direction. As a result, the gear mechanism 14 is operated in accordance with the forward rotation of the electric motor 15, so that the drive nut 14d is moved in the axial direction of the output shaft 14c to pull the brake cables 13 in the brake locking direction.

In case of YES at the step 310, the process goes to a step 325, at which the EPB-ECU 17 determines whether the time counter "CTL" for the locking operation (more exactly, the time counted by the time counter "CTL") is smaller than a predetermined maximum value "KTLUG" for the locking control time. The maximum value "KTLUG" for the locking control time is a maximum time, which is estimated as being necessary for carrying out (completing) the locking operation. Therefore, the maximum value "KTLUG" for the locking control time is likewise a value, which is in advance decided depending on the length of the brake cables 13, the rotational speed of the electric motor 15 and so on.

In the case that the time counter "CTL" for the locking operation is still continuously carrying out its counting process, even after the elapsed time from the start of the locking operation becomes larger than the maximum value "KTLUG" for the locking control time, it should be determined that any kind of malfunction occurs. For example, the above case may happen, when the gear mechanism 14 or the brake cables 13 are broken and thereby it takes a longer period until the motor current reaches at the target current value "KILT" for the locking operation.

In such a case (the determination at the step 325 is NO), the process goes to a step 330, at which the failure flag "FEPBF" for the parking brake is turned on. The process further goes on to the step 305, at which the process already explained above will be carried out. On the other hand, in case of YES at the step 325, the process goes to a step 335.

At the step 335, the EPB-ECU 17 determines whether electric current "IAM(n)" exceeds the target current value "KILT" for the locking operation or not. The electric current "IAM(n)" is the electric current "IAM" of the control cycle of this time. The motor current is changed depending on load applied to the electric motor 15. In the present embodiment, the load applied to the electric motor 15 is the tensile force of the brake cables 13. Accordingly, the electric current "IAM" corresponding to the motor current is a value corresponding to the load of the brake cables 13.

Therefore, in the case that the electric current "IAM(n)" exceeds the target current value "KILT" for the locking operation, it is regarded as a situation being closer to the condition that the desired braking force is generated by the tensile force of the brake cables 13. For example, it is the condition that the frictional surface of the brake shoe 11 of the parking brake device 12 is pressed against the inner surface of the drum 10 with a certain pressing force. Then, the process goes to a step 340. At the step 340, an increment process is carried out for the timer "CTILT" for terminating the locking operation.

The process further goes on to a step 345, at which the EPB-ECU 17 determines whether the timer "CTILT" for terminating the locking operation (more exactly, a time counted by the timer "CTILT") is larger than a termination time "KTILT" for the locking operation. Namely, the EPB-ECU 17 determines whether an elapsed time from a time point at which the braking force is regarded as becoming closer to the desired braking force has reached at such a time, during which it can be estimated that the desired braking force is generated. The process of the step 320 is repeatedly carried out until the timer "CTILT" for terminating the locking operation becomes larger than the termination time "KTILT" for the locking operation. And when the determination at the step 345 becomes YES, the process goes to a step 350.

At the step 350, the flag "FLOCK" for the locked condition which indicates that the locking operation has been completed is turned on, the time counter "CTL" for the locking operation as well as the timer "CTILT" for terminating the locking operation is reset to zero, and the locking operation of the electric motor 15 is turned off. As a result, the rotation of the electric motor 15 is stopped, so that the operation of the gear mechanism 14 is likewise stopped. The brake cables 13 can be held by the frictional force of the engagement between the output shaft 14c and the drive nut 14d at such a condition that the brake cables 13 are pulled. Namely, the braking force thus generated can be maintained. Accordingly, the movement of the vehicle is prevented during the vehicle parking condition. The process for the locking operation is thus completed.

When the determination at the step 130 in FIG. 4 is NO, the process goes to a step 170, at which the EPB-ECU 17 determines whether a flag "FREL" for a released condition is turned on or not. The flag "FREL" for the released condition here means a flag, which is turned on when the parking brake having been applied by the parking brake device 12 is released (un-locked) as a result of the operation of the EPB system 2. Therefore, when the flag "FREL" for the released condition is in the turned-on condition, the operation of the EPB system 2 has been already completed so that the braking force is already released.

When the determination at the step 170 in FIG. 4 is NO, the process goes to a step 180 for a process for releasing (un-locking) operation. In case of YES at the step 170, the process goes to the step 160 because the process for releasing (un-locking) operation is considered as having been completed.

Figure 7:
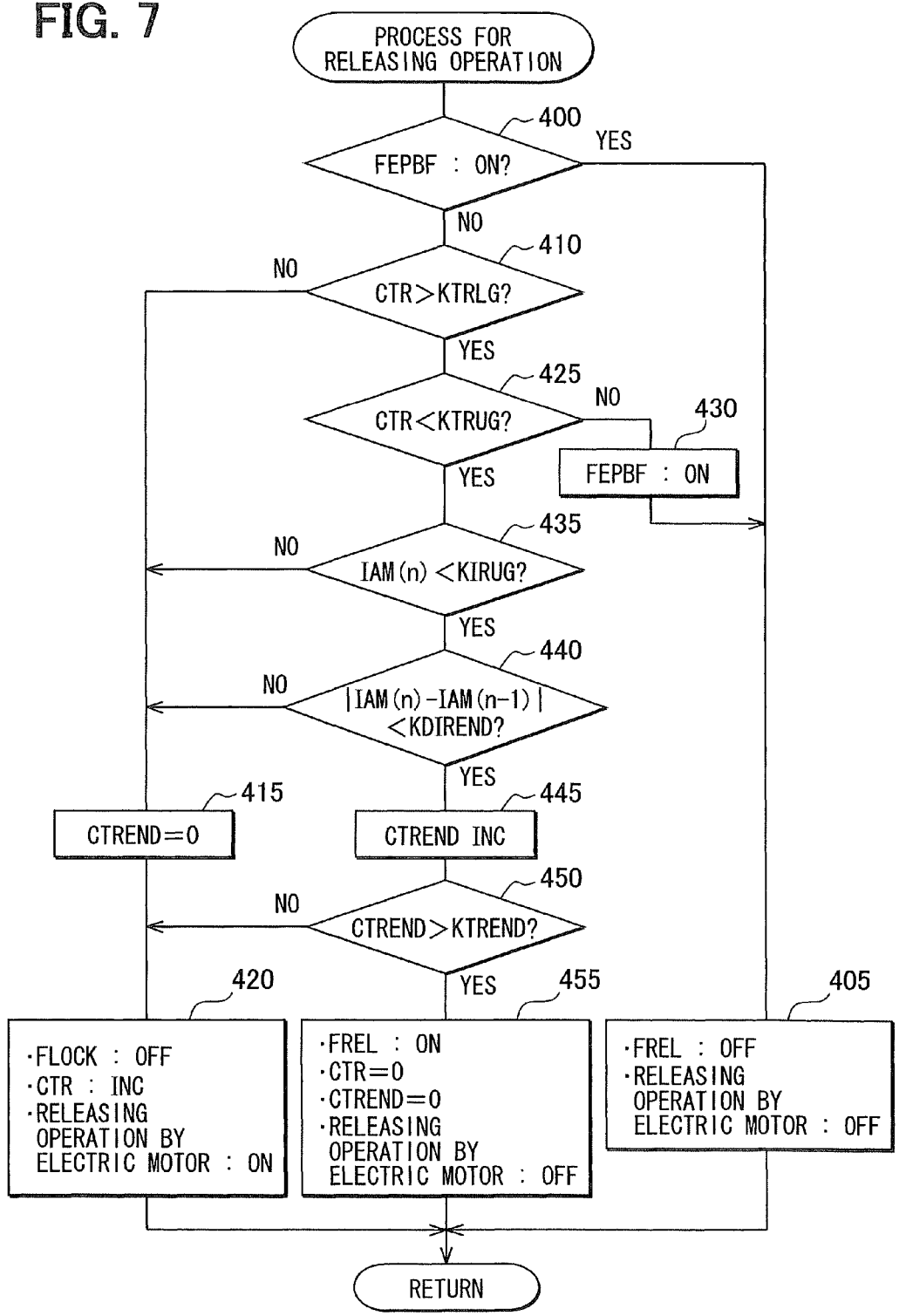
FIG. 7 is a flow-chart showing a process for a parking brake releasing (un-locking) operation.

In the process for the releasing (un-locking) operation, the EPB system 2 is operated so that the electric motor 15 is driven to rotate in order that the braking force generated by the parking brake device 12 is released. FIG. 7 shows a flow-chart for the process for the releasing (un-locking) operation (a process for a parking brake un-locking control operation). More detailed explanation for the process for the releasing operation will be made with reference to FIG. 7.

At first, the EPB-ECU 17 determines at a step 400 whether the failure flag "FEPBF" for the parking brake is turned on or not. In case of YES at the step 400, the process goes to a step 405. Since this is the case where any kind of malfunction occurs, the flag "FREL" for the released (un-locked) condition is turned off and a releasing (un-locking) operation of the electric motor 15 is turned off, namely the operation for the electric motor is not carried out or stopped, at the step 405. Then, the process for the releasing (un-locking) operation is ended. On the other hand, in case of NO at the step 400, the process goes to a step 410.

At the step 410, the EPB-ECU 17 determines whether a time counter "CTR" for the releasing (un-locking) operation (more exactly, a time counted by the time counter "CTR") exceeds a minimum value "KTRLG" for a releasing (un-locking) control time. The time counter "CTR" for the releasing (un-locking) operation is a counter for measuring an elapsed time since the releasing (un-locking) operation has been started, wherein the counter starts its counting operation immediately at the start of the releasing (un-locking) operation. The minimum value "KTRLG" for the releasing (un-locking) control time is a minimum time, which is estimated as being necessary for carrying out the releasing (un-locking) operation. The minimum value "KTRLG" for the releasing (un-locking) control time is a value similar to the minimum value "KTLLG" for the locking control time, and therefore it is a value, which is in advance decided depending on the length of the brake cables 13, the rotational speed of the electric motor 15 and so on.

A certain time period is necessary when the locked condition is changed to the released (un-locked) condition, in other words until the releasing operation is completed. Accordingly, it is regarded that the releasing (un-locking) operation is still being continuously carried out, when the time counter "CTR" for releasing (un-locking) operation is smaller than the minimum value "KTRLG" for the releasing (un-locking) control time. As a result, any determination error at the initial stage for the releasing operation is prevented in order that the releasing operation may not be terminated earlier.

Accordingly, when it is in the condition that the time counter "CTR" for the releasing (un-locking) operation (more exactly, the time counted by the time counter "CTR") does not exceed the minimum value "KTRLG" for the releasing (un-locking) control time (the determination at the step 410 is NO), the releasing (un-locking) operation is still being continuously carried out. The process, therefore, goes to a step 415, at which a timer "CTREND" for terminating the releasing (un-locking) operation is initialized to zero.

Then, the process further goes to a step 420, at which the flag "FLOCK" for the locked condition is turned off, an increment process is carried out for the time counter "CTR" for the releasing (un-locking) operation, and the releasing (un-locking) operation of the electric motor 15 is turned on, namely the electric motor 15 is driven to rotate in the reversed direction. As a result, the gear mechanism 14 is operated in accordance with the reversed rotation of the electric motor 15, so that the drive nut 14d is moved in the axial direction of the output shaft 14c to release the brake cables 13 in the brake releasing (un-locking) direction.

In case of YES at the step 410, the process goes to a step 425, at which the EPB-ECU 17 determines whether the time counter "CTR" for the releasing (un-locking) operation is smaller than a predetermined maximum value "KTRUG" for the releasing (un-locking) control time. The maximum value "KTRUG" for the releasing (un-locking) control time is a maximum time, which is estimated as being necessary for carrying out the releasing (un-locking) operation. Therefore, the maximum value "KTRUG" for the releasing (un-locking) control time is likewise a value similar to the maximum value "KTLUG" for the locking control time, and therefore it is a value, which is in advance decided depending on the length of the brake cables 13, the rotational speed of the electric motor 15 and so on.

In the case that the time counter "CTR" for the releasing (un-locking) operation is still continuously carrying out its counting process, even after the elapsed time from the start of the releasing (un-locking) operation becomes larger than the maximum value "KTRUG" for the releasing (un-locking) control time, it should be regarded that any kind of malfunction occurs. For example, the above case may happen, when the gear mechanism 14 or the brake cables 13 are broken.

In such a case (the determination at the step 425 is NO), the process goes to a step 430, at which the failure flag "FEPBF" for the parking brake is turned on. The process further goes on to the step 405. On the other hand, in case of YES at the step 425, the process goes to a step 435.

At the step 435, the EPB-ECU 17 determines whether the electric current "IAM(n)" for the control cycle of this time is smaller than a maximum guard current value "KIRUG" for the releasing (un-locking) operation or not. The motor current is changed depending on the load applied to the electric motor 15. However, the motor current does not generally exceed the electric current at no-load (no-load current). Accordingly, a maximum value of the no-load current is set as a threshold value for a maximum guard current. Since the motor current "IAM(n)" is compared with the maximum guard current value "KIRUG" at the step 435, such a case in which the electric current "IAM(n)" is instantaneously increased due to a noise (for example, as a result of the incoming current) can be removed, so that determination error is avoided in the following steps.

In case of NO at the step 435, the process goes on to the step 415 and the step 420. On the other hand, in case of YES at the step 435, the step goes to a step 440.

At the step 440, the EPB-ECU 17 determines whether an absolute value of the difference |IAM(n)–IAM(n–1)| between the electric current "IAM(n)" of the current control cycle and the electric current "IAM(n–1)" of the previous control cycle is smaller than a current changing amount "KDIREND" for determining termination of the releasing (un-locking) operation. The difference between the electric currents "IAM(n)" and "IAM(n–1)" corresponds to a variation (a changing amount) of the electric current "IAM", namely corresponds to a differentiated value "dMI(n)" of the electric current "IAM".

As explained above, the motor current (i.e. the electric current "IAM") is changed depending on the load applied to the electric motor 15. In the present embodiment, the load applied to the electric motor 15 corresponds to the tensile force of the brake cables 13. Therefore, as the tensile force of the brake cables 13 becomes smaller, the electric current becomes smaller. And when the tensile force becomes zero, namely when the braking force is released, the electric current becomes to a constant value. However, the electric current "IAM" varies depending on various conditions, such as temperature. Therefore, even though it is said that the electric current becomes to the constant value, the value includes fluctuation. It is not easy to confirm when the braking force is released, even in the case that the electric current "IAM" is detected. In other words, the timing at which the braking force is released can be determined by comparing the electric current "IAM" with a threshold value, if the value at which the electric current becomes constant could be decided in advance. However, as explained above, the above constant value includes the fluctuation, and therefore it is difficult to fix the threshold value.

According to the present embodiment, however, an attention is focused on that the above influence by the fluctuation can be removed when the differentiated value is used as the threshold value. Therefore, in the above step 440, the EPB-ECU 17 determines that the braking force is released, when the differentiated value of the electric current "IAM" becomes smaller than the current changing amount "KDIREND" for determining termination of the releasing (un-locking) operation, wherein the current changing amount "KDIREND" corresponds to the threshold value.

Even though the differentiated value of the electric current "IAM" is used as the threshold value, the differentiated value may vary depending on various parameters when the electric current "IAM" becomes to the constant value. Therefore, the current changing amount "KDIREND" is an acceptable value for the differentiated value of the electric current "IAM", wherein the variation of the electric current "IAM" is anticipated. Furthermore, the current changing amount "KDIREND" is set as such a value, which is smaller than a differentiated value of the electric current "IAM" in case that the tensile force is generated at the brake cables 13. As a result, the case in which the tensile force is generated at the brake cables 13 and the case in which the tensile force is disappeared can be compared with each other.

When the determination at the step 440 is YES, the process goes to a step 445, at which an increment process is carried out for a timer "CTREND" for terminating the releasing (un-locking) operation. Then, the process further goes on to a step 450, at which the EPB-ECU 17 determines whether the timer "CTREND" for terminating the releasing (un-locking) operation (more exactly, a time counted by the timer "CTREND") is larger than a termination time "KTREND" for the releasing (un-locking) operation. Namely, the EPB-ECU 17 determines whether an elapsed time from a time point at which the braking force is released has reached at such a time, during which it can be estimated that a gap corresponding to an allowance is formed between the frictional surface of the brake shoe 11 and the inner surface of the drum 10. The process of the step 420 is repeatedly carried out until the timer "CTREND" for terminating the releasing (un-locking) operation becomes larger than the termination time "KTREND" for the releasing (un-locking) operation. And when the determination at the step 450 becomes YES, the process goes to a step 455.

At the step 455, the flag "FREL" for the released (un-locked) condition which indicates that the releasing (un-locking) operation has been completed is turned on, the time counter "CTR" for the releasing (un-locking) operation as well as the timer "CTREND" for terminating the releasing (un-locking) operation is reset to zero, and the releasing (un-locking) operation of the electric motor 15 is turned off. As a result, the rotation of the electric motor 15 is stopped, so that the operation of the gear mechanism 14 is likewise stopped. The brake cables 13 can be held by the frictional force of the engagement between the output shaft 14c and the drive nut 14d at such a condition that the brake cables 13 are released. The process for the releasing (un-locking) operation is thus completed.

Figure 8:
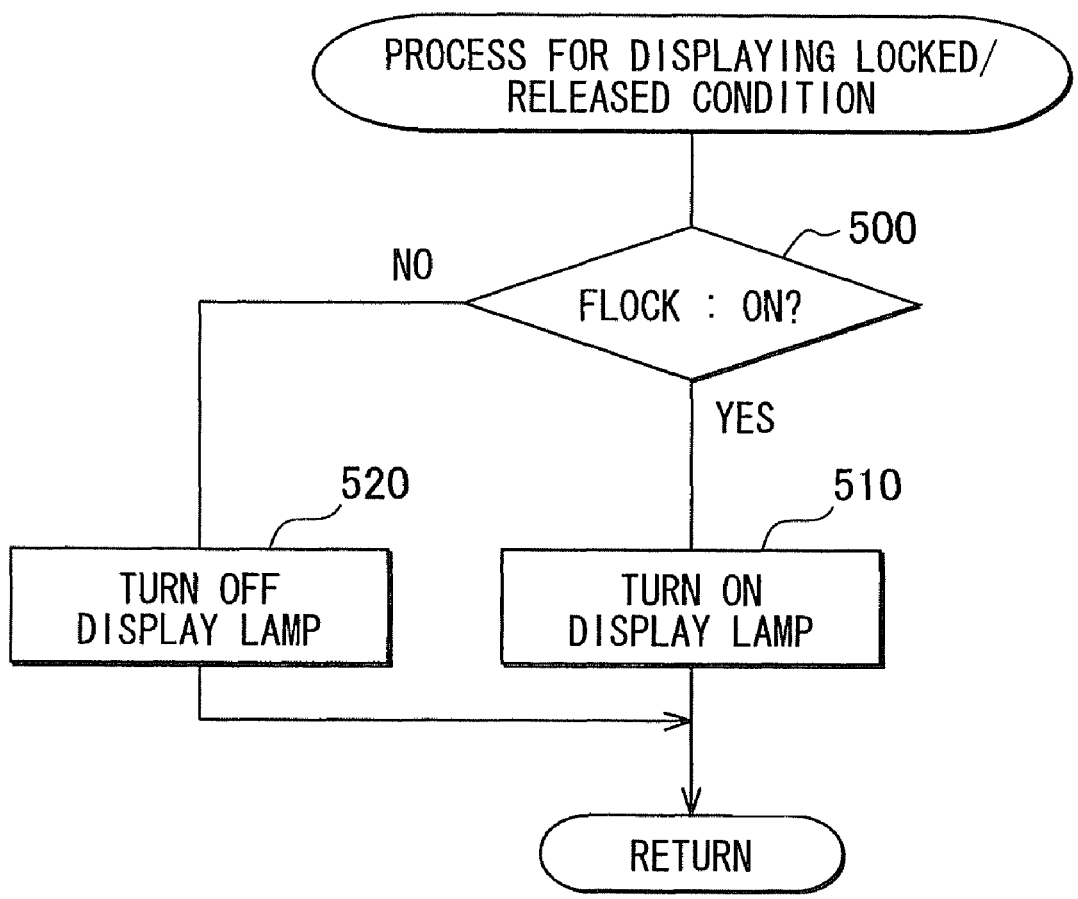
FIG. 8 is a flow-chart showing a process for displaying locked and released (un-locked) condition.

When the process for the locking operation as well as the process for the releasing (un-locking) operation is terminated as above, the step 160 of FIG. 4 for displaying the locked or released condition will be carried out. FIG. 8 is a flow-chart showing a process of displaying the locked or the un-locked (released) condition. More detailed explanation will be made with reference to FIG. 8.

At a step 500, the EPB-ECU 17 determines whether the flag "FLOCK" for the locked condition is turned on or not. In case of YES at the step 500, the process goes to a step 510, at which the display lamp 19 is turned on. In case of NO at the step 500, the process goes to a step 520 to turn off the display lamp 19. As above, the display lamp 19 is turned on when the EPB system 2 (the parking brake) is in the locked condition, whereas the display lamp 19 is turned off when the EPB system 2 (the parking brake) is in the released (un-locked) condition or the releasing (un-locking) control operation is started. Accordingly, it is possible to indicate the locked condition to the vehicle driver. The process for displaying the locked condition and/or the released (un-locked) condition is thus terminated. And the process for the parking brake control is completed.

Figure 9:
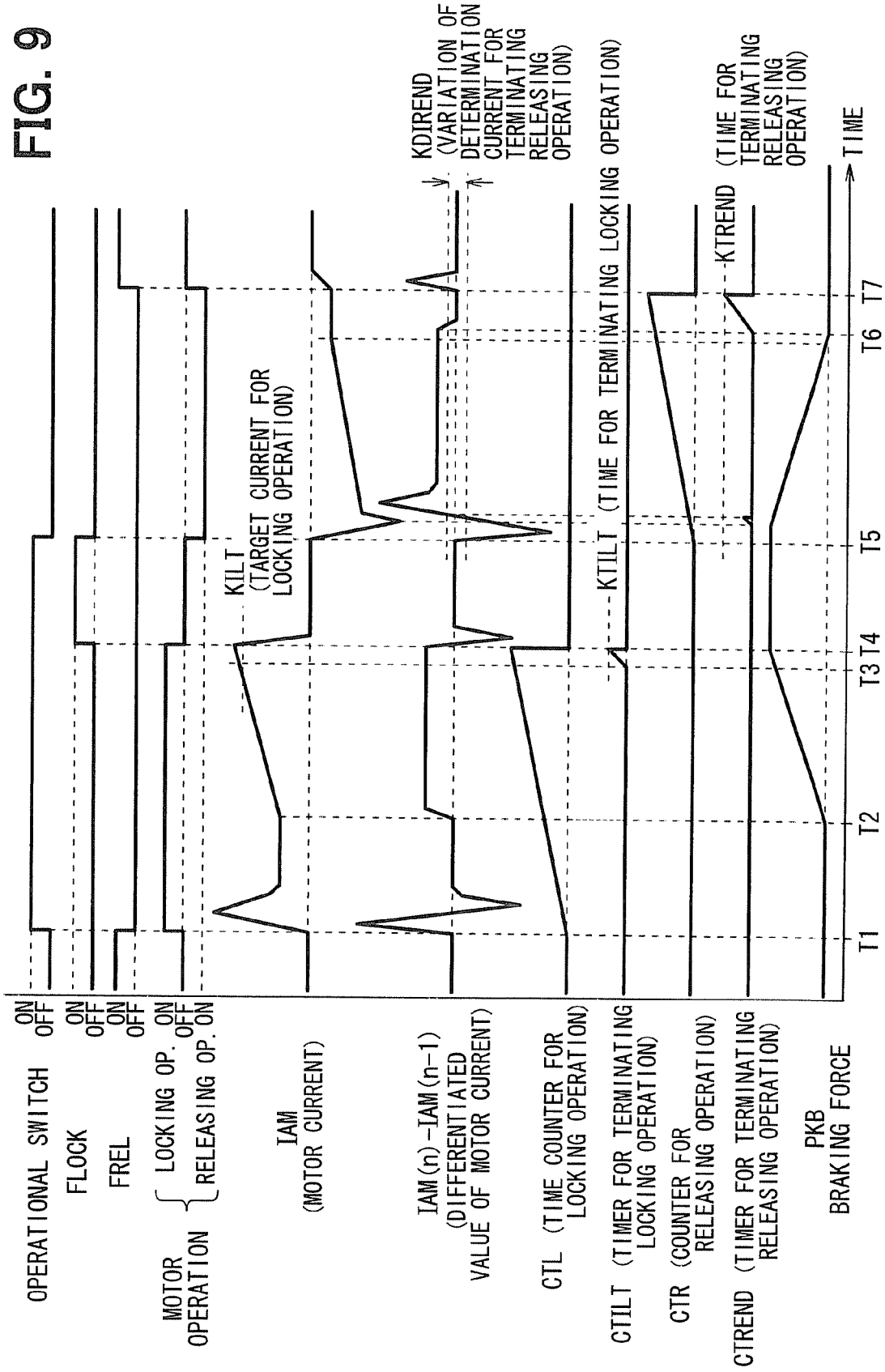
FIG. 9 is a time chart when the process for the parking brake control operation is carried out.

FIG. 9 is a time chart when the process for the parking brake control operation is carried out. As shown in FIG. 9, when the operational switch 18 is turned on at a time T1, the flag "FREL" for the released (un-locked) condition is changed from the turned-on to the turned-off condition. At the same time, the locking operation for the electric motor 15 is turned on, and the increment process is carried out for the time counter "CTL" for the locking operation. Furthermore, the electric current starts to flow to the electric motor 15 at the time T1. The electric current "IAM" (i.e. the motor current) instantaneously becomes a large value due to the incoming current at the initial stage for the current supply to the electric motor 15. Thereafter, the electric current "IAM" becomes at the constant value of the no-load current, which is the electric current when no tensile force is generated at the brake cables 13.

At a time T2, the tensile force starts to be generated at the brake cables 13, namely the braking force starts to be generated as a result that the frictional surface of the brake shoe 11 is brought into contact with the inner surface of the drum 10.

At a time T3, the electric current "IAM" reaches at the target current value "KILT" for the locking operation and the braking force generated by the tensile force of the brake cables 13 becomes closer to the desired value. Then, the increment operation is carried out for the timer "CTILT" for terminating the locking operation.

At a time T4, when the timer "CTILT" for terminating the locking operation (the time counted by the timer "CTILT") reaches at the termination time "KTILT" for the locking operation, the desired braking force is regarded as having been generated, and the locking operation is thereby completed. At the same time, the flag "FLOCK" for the locked condition is turned on and the current supply to the electric motor 15 is cut off (the locking control for the electric motor 15 is terminated). Furthermore, the time counter "CTL" for the locking operation as well as the timer "CTILT" for terminating the locking operation is reset to zero. As a result, the motor current is decreased to become to the value (that is zero) at the current-off.

At a time T5, when the operational switch 18 is turned off, the flag "FLOCK" for the locked condition is changed from the turned-on to the turned-off condition, and the releasing (un-locking) operation for the electric motor 15 is turned on. The increment process is carried out for the time counter "CTR" for the releasing (un-locking) operation. The electric current starts to flow to the electric motor 15.

In this situation, the motor current "IAM" flows in the reversed direction to rotate the electric motor 15 in the opposite direction. Therefore, the electric current "IAM" becomes a negative value, and thereby the electric current "IAM" instantaneously becomes a large value due to the incoming current at the initial stage for the current supply in the reversed direction to the electric motor 15. Thereafter, the electric current "IAM" is decreased to such a value, which corresponds to the tensile force generated at the brake cables 13.

During the above decreasing period, the value of "IAM(n)-IAM(n-1)" corresponding to the differentiated value of the electric current "IAM" may temporally become zero, so that the increment process may be erroneously carried out for the timer "CTREND" for terminating the releasing (un-locking) operation. However, since it is just for a short time period (an instant time), the timer is soon reset to zero. In addition, since the determination error during the starting period of the releasing operation is prevented by the step 410, the increment process will not be carried out for the timer "CTREND" for terminating the releasing (un-locking) operation during such starting period.

At a time T6, the tensile force at the brake cables 13 becomes zero, namely the braking force is released as a result that the frictional surface of the brake shoe 11 is separated from the inner surface of the drum 10. Then, the electric current "IAM" becomes the constant value, so that the value of "IAM(n)-IAM(n-1)" corresponding to the differentiated value of the electric current "IAM" is decreased. As a result, the absolute value of |IAM(n)-IAM(n-1)| becomes smaller than the current changing amount "KDIREND" for determining the termination of the releasing (un-locking) operation, so that the increment process is carried out for the timer "CTREND" for terminating the releasing (un-locking) operation.

At a time T7, when the timer "CTREND" for terminating the releasing (un-locking) operation (the time counted by the timer "CTREND") reaches at the termination time "KTREND" for the releasing (un-locking) operation, the braking force is released. Namely, the gap corresponding to the allowance is regarded as having been formed between the frictional surface of the brake shoe 11 and the inner surface of the drum 10. Since the releasing operation is thus completed, the flag "FREL" for the released condition is turned on, and the releasing operation for the electric motor 15 is stopped. Furthermore, the time counter "CTR" for the releasing (un-locking) operation as well as the timer "CTREND" for terminating the releasing (un-locking) operation is reset to zero. As a result, the motor current is decreased to become to the value (that is zero) at the current-off.

As explained above, according to the present embodiment, the time point for starting the releasing operation of the braking force generated by the EPB system 2 is calculated based on the differentiated value of the motor current (the electric current "IAM") of the releasing operation. In addition, the time point for terminating the releasing operation of the braking force is calculated from such starting time point. As a result, independently of the elongation of the brake cables 13, it is possible to correctly determine the time point at which the braking force has been released as well as the time point at which the releasing operation has been completed. Accordingly, the partial braking condition due to the insufficient releasing operation, in which the braking force is still partially applied to the vehicle wheels even after the parking brake force is released by the EPB system 2, can be avoided.

Second Embodiment

A second embodiment of the present invention will be explained. The second embodiment differs from the first embodiment in that the threshold values for various determinations are made as variable. The other points are the same to those of the first embodiment and the explanation thereof is omitted.

Figure 10:
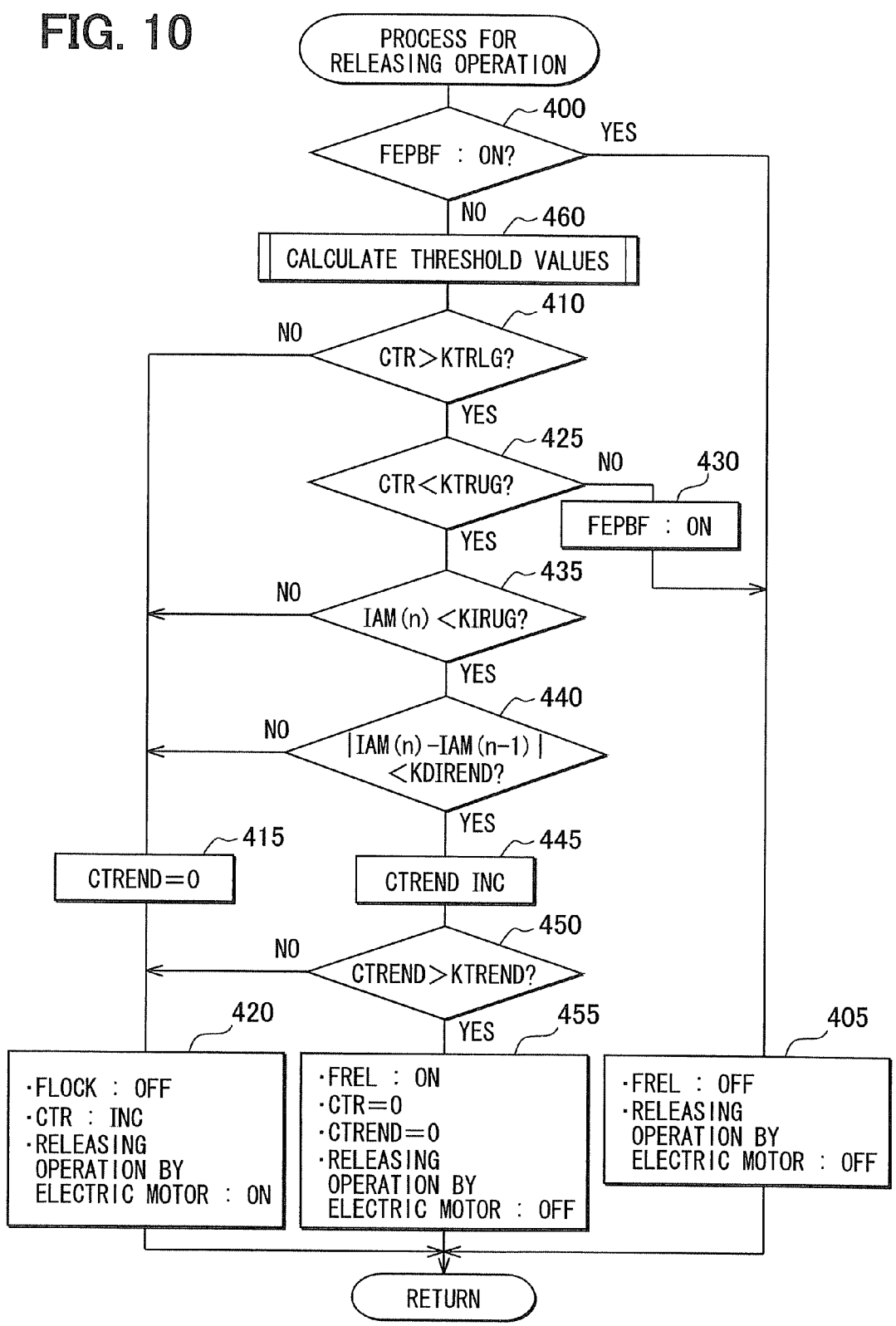
FIG. 10 is a flow-chart showing a process for a parking brake releasing (un-locking) operation according to a second embodiment of the present invention.

According to the embodiment, a step for calculating the threshold values is added to the process for the releasing (un-locking) operation of FIG. 7 of the first embodiment. FIG. 10 is a flow-chart showing a process for a parking brake releasing (un-locking) operation, which is used instead of the flow-chart of FIG. 7.

Figure 11:
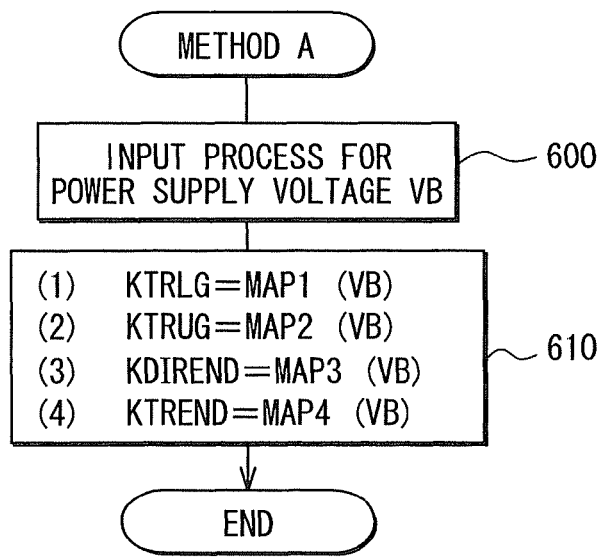
FIG. 11 is a flow-chart showing a process for calculating threshold values according to the second embodiment.

As shown in FIG. 10, a step 460 is inserted between the steps 400 and 410, and the calculation for the threshold values are done at the step 460. FIG. 11 is a flow-chart showing a process for calculating the threshold values. And FIGS. 12A to 12D are maps to be used for the calculation of the threshold values.

When the step 460 of FIG. 10 for calculating the threshold values is started, an input process of power supply voltage VB is carried out at a step 600 of FIG. 11. For example, the power supply voltage VB is constantly detected by a battery ECU (not shown). Therefore, the voltage detected by the battery ECU can be used as the input voltage at the step 600. The process goes to a step 610, at which various threshold values are set based on the maps shown in FIGS. 12A to 12D.

Figure 12A:
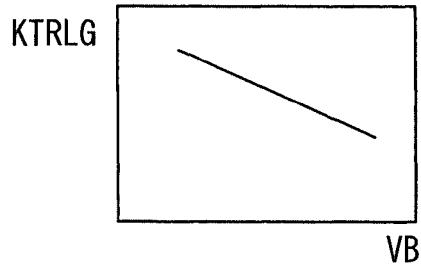
FIGS. 12A to 12D are maps to be used for the calculation of the threshold values of FIG. 11.

For example, FIG. 12A is the map showing a relation between the power supply voltage VB and the minimum value "KTRLG" for the releasing (un-locking) control time. When the power supply voltage becomes higher, the rotational speed of the electric motor 15 can be made higher, so that the time necessary for the releasing operation can be decreased. Therefore, the minimum value "KTRLG" for the releasing (un-locking) control time can be changed to a smaller value, as the power supply voltage VB becomes higher, as shown in the map of FIG. 12A.

Figure 12B:
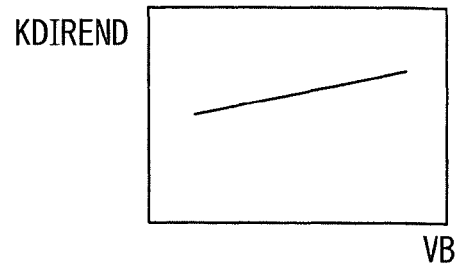

FIG. 12B is the map showing a relation between the power supply voltage VB and the current changing amount "KDIREND" for determining the termination of the releasing (un-locking) operation. When the power supply voltage VB becomes higher, a variation of the electric current becomes larger. Therefore, the current changing amount "KDIREND" for determining the termination of the releasing (un-locking) operation can be changed to a larger value, as the power supply voltage VB becomes higher, as shown in the map of FIG. 12B.

Figure 12C:
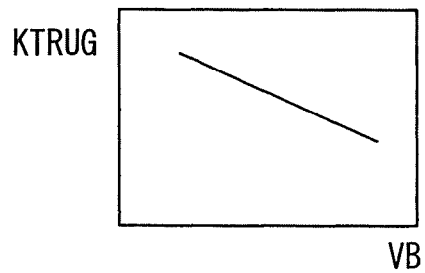

FIG. 12C is the map showing a relation between the power supply voltage VB and the maximum value "KTRUG" for the releasing (un-locking) control time. When the power supply voltage becomes higher, the rotational speed of the electric motor 15 can be made higher, so that the time necessary for the releasing operation can be decreased. Therefore, the maximum value "KTRUG" for the releasing (un-locking) control time can be changed to a smaller value, as the power supply voltage VB becomes higher, as shown in the map of FIG. 12C.

Figure 12D:
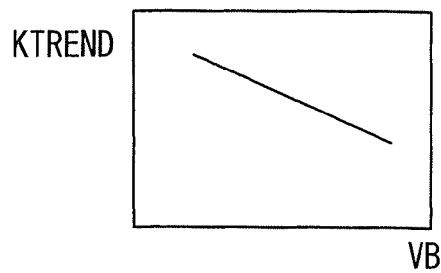

FIG. 12D is the map showing a relation between the power supply voltage VB and the termination time "KTREND" for the releasing (un-locking) operation. When the power supply voltage becomes higher, the rotational speed of the electric motor 15 can be made higher, so that the time necessary for forming the gap corresponding to the allowance between the frictional surface of the brake shoe 11 and the inner surface of the drum 10 can be decreased. Therefore, the termination time "KTREND" for the releasing (un-locking) operation can be changed to a smaller value, as the power supply voltage VB becomes higher, as shown in the map of FIG. 12D.

As above, the minimum value "KTRLG" for the releasing (un-locking) control time, the current changing amount "KDIREND" for determining the termination of the releasing (un-locking) operation, the maximum value "KTRUG" for the releasing (un-locking) control time, and the termination time "KTREND" for the releasing (un-locking) operation can be calculated, so that the threshold values may be changed depending on the power supply voltage VB.

The process at the step 460 of FIG. 10 for calculating the threshold values is thus completed, and the following steps in FIG. 10, which are identical to the steps of FIG. 7, will be carried out. The above calculated threshold values, such as the minimum value "KTRLG" for the releasing (un-locking) control time, will be used in the following steps 410, 425, 440 and 450 of FIG. 10.

As explained above, the various kinds of the threshold values can be changed depending on the power supply voltage VB, so that the threshold values can be changed to more appropriate values depending on the power supply voltage. As a result, the effects of the first embodiment can be also obtained in the second embodiment in a more accurate manner.

Third Embodiment

A third embodiment of the present invention will be explained. The third embodiment differs from the second embodiment in that the manner for calculating the threshold values is so changed that the threshold values are changed depending on the differentiated value of the motor current. The other points are the same to those of the second embodiment and the explanation thereof is omitted.

Figure 13:
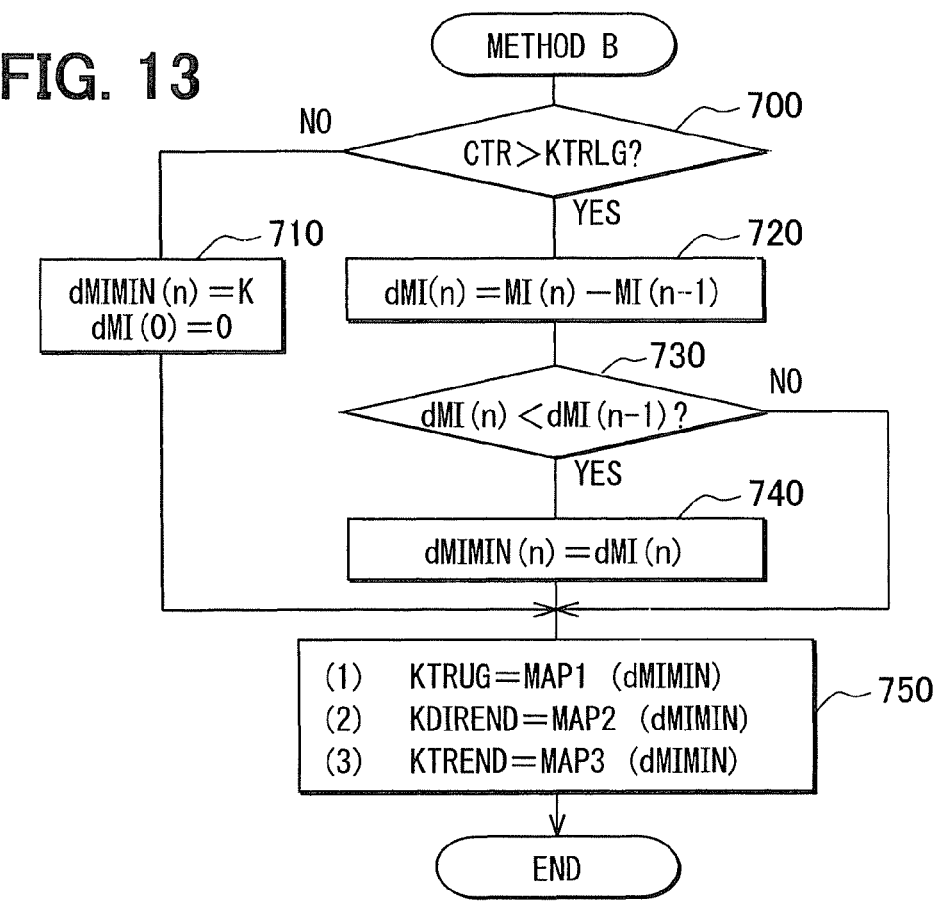
FIG. 13 is a flow-chart showing a process for calculating the threshold values according to a third embodiment.
Figure 14A:
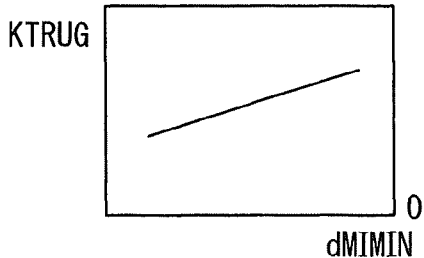
FIGS. 14A to 14C are maps to be used for the calculation of the threshold values of FIG. 13.
Figure 14B:
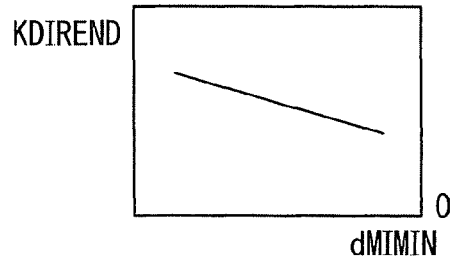
Figure 14C:
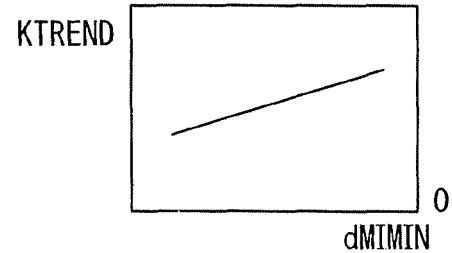

According to the third embodiment, the process for releasing operation is carried out in accordance with the flow-chart of FIG. 10. However, the step 460 of FIG. 10 is carried out in a different manner from the second embodiment. FIG. 13 is a flow-chart showing the process for calculating the threshold values, which is carried out instead of the flow-chart of FIG. 11. And FIGS. 14A to 14C are maps to be used for the calculation of the above threshold values.

When the step 460 of FIG. 10 for calculating the threshold values is started, the EPB-ECU 17 determines at a step 700 of FIG. 13 whether the time counter "CTR" for releasing (un-locking) operation (the time counted by the time counter "CTR") exceeds the minimum value "KTRLG" for the releasing (un-locking) control time. The process goes to a step 710, until the determination of the step 700 becomes YES. At the step 710, the differentiated value of the electric current "IAM" is set to zero ("dMI(0)"=0), and its minimum value is set to K ("dMIMIN(n)"=K), wherein K means a constant value.

In case of YES at the step 700, the process goes to a step 720, at which the differentiated value "dMI(n)" is calculated based on a difference between the electric current IMA(n) for the control cycle of this time and the electric current IMA(n−1) for the control cycle of previous time.

The above figure of "dMI(0)" means an initial value for the differentiated value "dMI(n)". And the minimum value "dMIMIN(n)" means a value, which is minimum among the differentiated values "dMI(n)" for the control cycles of "n" times.

At a step 730, the EPB-ECU 17 determines whether the differentiated value "dMI(n)" for the control cycle of this time is smaller than the differentiated value "dMI(n−1)" for the control cycle of the previous time. In case of YES at the step 730, the process goes to a step 740, at which the minimum value "dMIMIN(n)" is renewed by the differentiated value "dMI(n)" for the control cycle of this time. In case of NO at the step 730, the minimum value "dMIMIN(n)" is not renewed, namely, the minimum value "dMIMIN(n−1)" for the control cycle of the previous time is maintained.

Then, the process goes to a step 750, at which various threshold values are set based on the maps shown in FIGS. 14A to 14C.

For example, FIG. 14A is the map showing a relation between the minimum value "dMIMIN(n)" for the differentiated value and the maximum value "KTRUG" for the releasing (un-locking) control time. The minimum value "dMIMIN(n)" for the differentiated value is designated by a negative figure in case of the releasing (un-locking) operation. When the minimum value "dMIMIN(n)" is smaller, a gradient of the motor current is smaller (that is, a steep angle in the negative direction). This means that the time necessary for the releasing operation becomes shorter. Therefore, the maximum value "KTRUG" for the releasing (un-locking) control time can be changed to a smaller value, as the minimum value "dMIMIN(n)" for the differentiated value becomes smaller, as shown in the map of FIG. 14A.

FIG. 14B is the map showing a relation between the minimum value "dMIMIN(n)" for the differentiated value and the current changing amount "KDIREND" for determining the termination of the releasing (un-locking) operation. As explained above, when the minimum value "dMIMIN(n)" becomes smaller, the gradient of the motor current becomes smaller. This means that when the minimum value "dMIMIN(n)" becomes smaller, the variation of the motor current becomes larger. Therefore, the current changing amount "KDIREND" for determining the termination of the releasing (un-locking) operation can be changed to a larger value, as the minimum value "dMIMIN(n)" for the differentiated value becomes smaller, as shown in the map of FIG. 14B.

FIG. 14C is the map showing a relation between the minimum value "dMIMIN(n)" for the differentiated value and the termination time "KTREND" for the releasing (un-locking) operation. As explained above, when the minimum value "dMIMIN(n)" becomes smaller, the gradient of the motor current becomes smaller. This means that when the minimum value "dMIMIN(n)" becomes smaller, the rotational speed of the electric motor 15 can be made higher, so that the time necessary for forming the gap corresponding to the allowance between the frictional surface of the brake shoe 11 and the inner surface of the drum 10 can be decreased. Therefore, the termination time "KTREND" for the releasing (un-locking) operation can be changed to a smaller value, as the minimum value "dMIMIN(n)" becomes smaller, as shown in the map of FIG. 14C.

As above, the maximum value "KTRUG" for the releasing (un-locking) control time, the current changing amount "KDIREND" for determining the termination of the releasing (un-locking) operation, and the termination time "KTREND" for the releasing (un-locking) operation can be calculated, so that the threshold values may be changed depending on the minimum value "dMIMIN(n)" for the differentiated value.

The process at the step 460 of FIG. 10 for calculating the threshold values is thus completed, and the following steps in FIG. 10, which are identical to the steps of FIG. 7, will be carried out. The above calculated threshold values, such as the maximum value "KTRUG" for the releasing (un-locking) control time, will be used in the following steps 425, 440 and 450 of FIG. 10.

As explained above, the various kinds of the threshold values can be changed depending on the minimum value "dMIMIN(n)" for the differentiated value, so that the threshold values can be changed to more appropriate values depending on the minimum value "dDMIMIN(n)" for the differentiated value. As a result, the effects of the first embodiment can be also obtained in the third embodiment in a more accurate manner.

Other Embodiments

In the above second and third embodiments, the various kinds of the threshold values are changed depending on the power supply voltage VB or the minimum value "dMIMIN (n)" for the differentiated value. However, the threshold values may be changed depending on other parameters. For example, the maximum guard current value "KIRUG" for the releasing (un-locking) operation may be changed depending on temperature. In general, when the temperature becomes lower, the no-load current for the electric motor 15 becomes larger. Therefore, the maximum guard current value "KIRUG" for the releasing (un-locking) operation may be changed to a larger value, as the temperature becomes lower.

In the above embodiments, for example, as shown in FIG. 3, the electric currents "IAM" and "IBM" are detected at such positions, at which the direction of the motor current is reversed in the cases where the electric motor 15 is rotated in the forward direction and in the reversed direction. This is, however, an example. Therefore, the electric currents "IAM" and "IBM" may be detected at such positions, where the direction of the motor current is always the same to each other. In such a case, the plus and minus for the electric currents "IAM" and "IBM" are always the same to each other. Therefore, the plus-and-minus symbol for the minimum value "dMIMIN(n)" for the differentiated value is reversed, when compared with the above embodiments. However, in this case, since the plus-and-minus symbol is simply changed, the plus-and-minus symbol for the threshold values may be correspondingly changed. Accordingly, the termination time "KTREND" for the releasing (un-locking) operation may be changed to a smaller value, as an absolute figure for the minimum value "dMIMIN(n)" for the differentiated value becomes larger.

Furthermore, in the above case, the minimum value "dMIMIN(n)" for the differentiated value is used. However, the termination time "KTREND" for the releasing (un-locking) operation may be changed to a smaller value, simply depending on the differentiated value "dMI(n)".

In the above embodiments, the brake shoe 11 is explained as the frictional material for generating the braking force of the EPB system 2, and the inner surface of the drum 10 is explained as the frictional surface fixed to the vehicle wheel. Any other types of the parking brake device, for example the disc-brake type, may be used for the parking brake device of the EPB system.

In the above embodiments, the operational switch 18 is explained as a means for instructing the operation for the EPB system 2. An operational lever, an operational pedal and so on may be used in place of the operational switch 18.

What is claimed is:

1. A parking brake control system for a vehicle comprising:
a switching device operated by a vehicle driver;
a parking brake device provided at a vehicle wheel and having a movable frictional member and a fixed member, wherein a braking force is generated at the parking brake device and applied to the vehicle wheel when the movable frictional member is moved to be pressed against the fixed member;
an electric motor operatively connected to the movable frictional member of the parking brake device via a brake cable, so that the brake cable is pulled by a rotation of the electric motor in a forward direction to move the movable frictional member in order to generate the braking force at the parking brake device, and the brake cable is released by the rotation of the electric motor in a reversed direction so as to move the movable frictional member to release the braking force generated at the parking brake device;
a motor current detecting device for detecting electric current flowing through the electric motor;
an electronic control unit electrically connected to the switching device and the electric motor so as to drive the electric motor for carrying out a parking brake locking operation or a parking brake releasing operation upon receiving a control signal from the switching device;
wherein the electronic control unit current supply to the electric motor is stopped in case of carrying out the parking brake releasing operation, when a time period in which a differentiated value of the electric current flowing through the electric motor is smaller than a predetermined threshold value exceeds a predetermined time;
wherein a releasing control time for the parking brake releasing operation is measured by a time counter from a start of the rotation of the electric motor in the reversed direction; and
wherein a step of determination, in which the electronic control unit determines whether the differentiated value of the electric current flowing through the electric motor is smaller than the predetermined threshold value, is carried out only when the releasing control time is larger than a predetermined minimum value for the parking brake releasing operation.

2. A parking brake control system for a vehicle comprising:
a switching device operated by a vehicle driver;
a parking brake device provided at a vehicle wheel and having a movable frictional member and a fixed member, wherein a braking force is generated at the parking brake device and applied to the vehicle wheel when the movable frictional member is moved to be pressed against the fixed member;
an electric motor operatively connected to the movable frictional member of the parking brake device via a brake cable, so that the brake cable is pulled by a rotation of the electric motor in a forward direction to move the movable frictional member in order to generate the braking force at the parking brake device, and the brake cable is released by the rotation of the electric motor in a reversed direction so as to move the movable frictional member to release the braking force generated at the parking brake device;
a motor current detecting device for detecting electric current flowing through the electric motor;
an electronic control unit electrically connected to the switching device and the electric motor so as to drive the electric motor for carrying out a parking brake locking operation or a parking brake releasing operation upon receiving a control signal from the switching device;
wherein the electronic control unit current supply to the electric motor is stopped in case of carrying out the parking brake releasing operation, when a time period in which a differentiated value of the electric current flowing through the electric motor is smaller than a predetermined threshold value exceeds a predetermined time; and
wherein the step of determination, in which the electronic control unit determines whether the differentiated value of the electric current flowing through the electric motor is smaller than the predetermined threshold value, is carried out only when the electric current is smaller than a maximum value of a no-load current for the electric motor.

* * * * *